United States Patent
Khandelwal et al.

(10) Patent No.: US 12,423,571 B2
(45) Date of Patent: Sep. 23, 2025

(54) TRAINING ACTOR-CRITIC ALGORITHMS IN LABORATORY SETTINGS

(71) Applicants: Sony Corporation, Tokyo (JP); Sony Corporation of America, New York, NY (US)

(72) Inventors: Piyush Khandelwal, Austin, TX (US); James MacGlashan, Riverside, RI (US); Peter Wurman, Acton, MA (US)

(73) Assignee: SONY GROUP CORPORATION, Tokyo (JP)

( * ) Notice: Subject to any disclaimer, the term of this patent is extended or adjusted under 35 U.S.C. 154(b) by 880 days.

(21) Appl. No.: 17/003,673

(22) Filed: Aug. 26, 2020

(65) Prior Publication Data
US 2022/0067504 A1   Mar. 3, 2022

(51) Int. Cl.
*G06N 3/045* (2023.01)
*G06N 3/08* (2023.01)

(52) U.S. Cl.
CPC ............... *G06N 3/08* (2013.01); *G06N 3/045* (2023.01)

(58) Field of Classification Search
CPC .................................. G06N 3/08; G06N 3/045
See application file for complete search history.

(56) References Cited

U.S. PATENT DOCUMENTS

| | | | |
|---|---|---|---|
| 9,875,440 B1 | 1/2018 | Commons | |
| 2018/0165602 A1 | 6/2018 | Van Seijen | |
| 2019/0036229 A1 | 1/2019 | Kim et al. | |
| 2019/0072959 A1 | 3/2019 | Palanisamy et al. | |
| 2019/0258918 A1 | 8/2019 | Wang et al. | |
| 2020/0241542 A1* | 7/2020 | Sung | B60W 40/09 |
| 2021/0295171 A1* | 9/2021 | Kamenev | G06N 3/088 |

FOREIGN PATENT DOCUMENTS

| | | |
|---|---|---|
| CA | 3032182 A1 | 7/2019 |
| CN | 101461235 A | 6/2009 |
| CN | 101715008 A | 5/2010 |

(Continued)

OTHER PUBLICATIONS

Akimov, D., Distributed Soft Actor-Critic with Multivariate Reward Representation and Knowledge Distillation, [received Mar. 31, 2023]. Retrieved from internet:<https://arxiv.org/abs/1911.13056> (Year: 2019).*

(Continued)

*Primary Examiner* — Miranda M Huang
*Assistant Examiner* — Bart I Rylander
(74) *Attorney, Agent, or Firm* — INNOVATION CAPITAL LAW GROUP, LLP; Vic Lin

(57) ABSTRACT

Reinforcement learning methods can use actor-critic networks where (1) additional laboratory-only state information is used to train a policy that much act without this additional laboratory-only information in a production setting; and (2) complex resource-demanding policies are distilled into a less-demanding policy that can be more easily run at production with limited computational resources. The production actor network can be optimized using a frozen version of a large critic network, previously trained with a large actor network. Aspects of these methods can leverage actor-critic methods in which the critic network models the action value function, as opposed to the state value function.

16 Claims, 4 Drawing Sheets

(56) References Cited

FOREIGN PATENT DOCUMENTS

| CN | 209430342 U | 9/2019 |
|---|---|---|
| WO | WO-2018212918 A1 | 11/2018 |
| WO | WO-2018224695 A1 | 12/2018 |
| WO | 2019002465 A1 | 1/2019 |
| WO | 2019149949 A1 | 8/2019 |
| WO | WO-2020154542 A1 | 7/2020 |

OTHER PUBLICATIONS

Bahdanau, et al, An Actor-Critic Algorithm for Sequence Prediction, [received Mar. 31, 2023]. Retrieved from Internet:<https://arxiv.org/abs/1607.07086> (Year: 2017).*

Karagiannakos, S., The idea behind Actor-Critics and how A2C and A3C improve them, [received Mar. 31, 2023]. Retrieved from Internet:<https://theaisummer.com/Actor_critics/> (Year: 2018).*

Sung, et al, Learning to Learn: Meta-Critic Networks for Sample Efficient Learning, [received Mar. 31, 2023]. Retrieved from Internet:<https://arxiv.org/abs/1706.09529> (Year: 2017).*

Zou, et al, Application of the asynchronous advantage actor-critic machine learning algorithm to real-time accelerator tuning, [received Mar. 31, 2023]. Retrieved from Internet:<https://link.springer.com/article/10.1007/s41365-019-0668-1> (Year: 2019).*

Pfau, et al, Connecting Generative Adversarial Networks and Actor-Critic Methods, [received Mar. 31, 2023]. Retrieved from Internet:<https://arxiv.org/abs/1610.01945> (Year: 2016).*

Zhang, et al, Accelerating the Deep Reinforcement Learning with Neural Network Compression, [received on Oct. 10, 2023]. Retrieved from Internet:<https://ieeexplore.ieee.org/abstract/document/8852451> (Year: 2019).*

Konda, V., et al., Actor-Critic Algorithms, [received on Apr. 11, 2024]. Retrieved from Internet:<https://proceedings.neurips.cc/paper/1999/hash/6449f44a102fde848669bdd9eb6b76fa-Abstract.html> (Year: 1999).*

Silver, D., et al., Deterministic Policy Gradient Algorithms, [received Jul. 26, 2024]. Retrieved from Internet:<https://proceedings.mlr.press/v32/silver14.html> (Year: 2014).*

S. Wadhwania et al: "Policy distillation and value matching in multiagent reinforcement learning", Proceedings of the 2019 IEEE/RSJ International Conference on Intelligent Robots and Systems (IROS'19), Nov. 4, 2019 (Nov. 4, 2019), pp. 8193-8200, XP033695468.

W. M. Czarnecki et al: "Distilling policy distillation", arxiv.org, Cornell University Library, Feb. 6, 2019 (Feb. 6, 2019), 17 pp., Ithaca, NY XP081026000.

International Search Report & Written Opinion dated Aug. 19, 2021 from PCT Application No. PCT/US2021/030912.

David Pfau et al. , "Connecting Generative Adversarial Networks and Actor-Critic Methods", arXiv [online] , version 3 , 2017 year , p. 1~10 , [search date Feb. 13, 2024].

Flood Sung et al. , "Learning to Learn: Meta-Critic Networks for Sample Efficient Learning", arXiv , version 1 , 2017 year , p. 1~12 , [search date Feb. 13, 2024].

Hongjie Zhang et al. , "Accelerating the Deep Reinforcement Learning with Neural Network Compression", IEEE Xplore[online] , 2019 year , p. 1~8 , [search date Feb. 13, 2024].

Xiaoqin Zhang, et al.,. "Pretraining Deep Actor-Critic Reinforcement Learning Algorithms With Expert Demonstrations", Jan. 2018, Dept. of EE, Tsinghua University.

Tiantai Zhou et al, "Artificial Neural Networks Used in the Direct-Fired Absorption Chiller System Identification", Journal of Refrigeration, 01 Mar. 25, 2001, 25 pgs.

\* cited by examiner

TRAINING ACTOR-CRITIC ALGORITHMS IN LABORATORY SETTINGS

BACKGROUND OF THE INVENTION

1. Field of the Invention

Embodiments of the invention relates generally to reinforcement learning methods. More particularly, the invention relates to systems and methods for improving the performance of an actor network when training an actor-critic model.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Reinforcement learning (RL) describes a class of problems (and solutions) in which an artificial agent optimizes its control of a system (or "environment") when the system dynamics are unknown and must be learned by the agent through interaction and observation. Typically, RL problems and solutions consider learning and optimization to be performed in a single continual lifetime of the agent. However, because initial performance of a learning agent will be poor and often unsafe in industry settings, industry applications of RL benefit from separating RL into two phases: (1) a learning phase that happens in a safe laboratory, and (2) a production phase in which the laboratory-learned controller, or "policy" is deployed without any subsequent learning.

In view of the foregoing, there is a need for a system and method making better use of these two phases to improve reinforcement learning, especially in agents with limited computational resources.

SUMMARY OF THE INVENTION

Embodiments of the present invention provide a method of training an agent comprising training a policy using an actor network and a critic network using state information available in a both a laboratory setting and in a production setting, wherein the state information available in the laboratory setting is greater than the state information available in the production setting; optimizing the critic network with an actor network; and providing a production actor network for the agent in the production setting.

In some embodiments, the critic network is trained based on an action value function.

In some embodiments, when the training is complete, the method further includes duplicating the critic network into a frozen critic network and optimizing the production actor network using the frozen critic network.

In some embodiments, a first actor-critic algorithm runs during the training of the critic network and a second actor-critic algorithm runs during the step of optimizing the production actor network using the frozen critic network. In some embodiments, the first actor-critic algorithm is the same as the second actor-critic algorithm.

Embodiments of the present invention further provide a method of training an agent comprising training a policy using an actor network and a critic network; optimizing the critic network with an actor network; providing a production actor network for the agent in a production setting; duplicating the critic network, when the training is complete, into a frozen critic network; and optimizing the production actor network using the frozen critic network, wherein the production actor network is smaller than the actor network.

Embodiments of the present invention also provide a non-transitory computer-readable storage medium with an executable program stored thereon, wherein the program instructs one or more processors to perform the following steps training a policy using an actor network and a critic network using state information available in a both a laboratory setting and in a production setting, wherein the state information available in the laboratory setting is greater than the state information available in the production setting; optimizing the critic network with an actor network; and providing a production actor network for the agent in the production setting.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
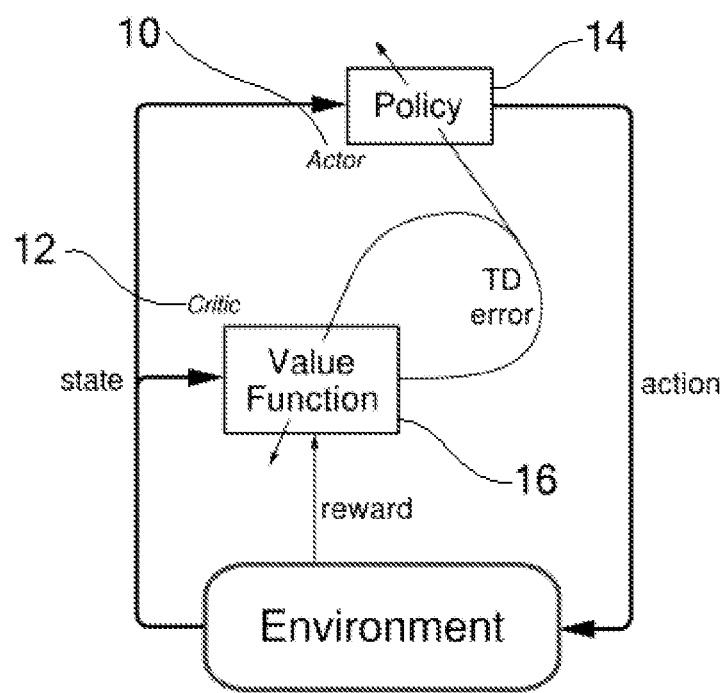
FIG. 1 illustrates a schematic representation of an actor-critic model of reinforcement learning.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

The term "robot" may refer to any system controlled directly or indirectly by a computer or computing system that issues actions or commands in response to senses or observations. The term may refer without limitation to a traditional physical robot with physical sensors such as cameras, touch sensors, range sensors, and the like, or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, etc.), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

The terms "observation" or "observations" refers to any information the agent receives by any means about the agent's environment or itself. In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" refers to the agent's any means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about agent's action(s) may include, without limitation, a probability distribution over agent's action(s), and/or outgoing information meant to influence the agent's ultimate choice of action.

The term "state" or "state information" refers to any collection of information regarding the state of the environment or agent, which may include, without limitation, information about the agent's current and/or past observations.

The term "policy" refers to any function or mapping from any full or partial state information to any action information. Policies may be hard coded or may be modified, adapted or trained with any appropriate learning or teaching method, including, without limitation, any reinforcement-learning method or control optimization method. A policy may be an explicit mapping or may be an implicit mapping, such as without limitation one that may result from optimizing a particular measure, value, or function. A policy may include associated additional information, features, or characteristics, such as, without limitation, starting conditions (or probabilities) that reflect under what conditions the policy may begin or continue, termination conditions (or probabilities) reflecting under what conditions the policy may terminate.

Broadly, embodiments of the present invention provide reinforcement learning methods using actor-critic networks where (1) additional laboratory-only state information is used to train a policy that much act without this additional laboratory-only information in a production setting; and (2) complex resource-demanding policies are distilled into a less-demanding policy that can be more easily run at production with limited computational resources. Aspects of these methods can leverage actor-critic methods in which the critic network models the action value function, as opposed to the state value function.

An RL problem is typically framed as a Markov Decision Process (MDP). An MDP can be expressed as $M = \langle S, A, P, R \rangle$ where:

S represents the environment's state space. A given state $s_t \in S$ completely describes the circumstances in the environment leading up to time t;

A is the set of actions the system can take;

P is the transition function that gives the transition probability of reaching a particular next state from a given state-action pair; and R is the reward function $R(s_t, a_t, s_{t+1})$ that defines the reward received when action $a_t \in A$ is taken from state $s_t \in S$ and the environment transitions to from state s to new state $s_{t+1} \in S$.

The goal of an RL algorithm is to find a policy $\pi(s)$, a mapping from states to actions, that will maximize the cumulative reward over time when the agent follows it. In practice, the agent may only be able to partially observe the current MDP state. In such cases, the agent must find a policy $\pi(o)$ that is a mapping from observations to actions that will maximize cumulative reward.

In an RL setting, the agent does not have direct access to the transition function. Instead, the agent can interact with the environment (choose actions) and observe the outcomes (the states and rewards). From these observations, the agent can record a dataset and use this dataset to learn a policy.

Two functions often estimated in RL algorithms are the state value function $V^\pi(s)$ and the action value function $Q^\pi(s, a)$. The state value function $V^\pi(s)$ is the expected cumulative future reward when policy $\pi$ is followed from state s. The action value function $Q^\pi(s; a)$ is the expected cumulative future reward when action a is first executed from state s, and then policy $\pi$ is followed from the resulting state thereafter.

Deep Actor-Critic RL algorithms are a family of algorithms that can be used to learn a policy, and typically make use of the following two distinct deep neural networks. The Actor Network represents the policy network $\pi(o)$ described in the MDP definition and is responsible for selecting the control action. Once training is complete, only this network is necessary for computing actions during evaluation or testing. The Critic Network predicts long-term reward for actions taken by the actor. Depending on the algorithm, the critic network will directly estimate either the state value function or the action value function for the policy defined by the actor network. The actor is improved by optimizing its action choices against this critic network. FIG. 1 illustrates a simplified version of exemplary interactions between the actor network 10 and the critic network 12. Here, the critic network 12 generates a value function 14, such as the action value function, for the policy 16. This function can generate an error, such as a temporal difference (TD) error that is used to improve the actor and critic networks 10, 12.

Embodiments of the present invention provide methods to improve the performance of the actor network for a class of problems that satisfy the following constraints. (1) Training can be done via data collected in laboratory settings where more state information and compute resources are available. For example, a driverless car may have additional/improved sensors in a laboratory than out on the road once in production. (2) Training in the field and outside of a lab is unnecessary, allowing a policy to be trained in the lab and then deployed into production.

Problems that satisfy these two constraints can be defined as Laboratory RL problems. Exemplary methods of the present invention, as described herein, regard Laboratory RL problems and make use of actor-critic reinforcement learning. In particular, embodiments of the present invention can leverage actor-critic methods in which the critic network models the action value function (as opposed to the state value function).

For the effective optimization of an actor network, the critic network should accurately estimate the action value function. However, in typical RL systems that do not distinguish between laboratory training and production execution, critic networks are trained using only the observations that will be available at production. Consequently, the critic may produce less accurate estimates of the action value function and result in worse training of the actor.

Figure 2:
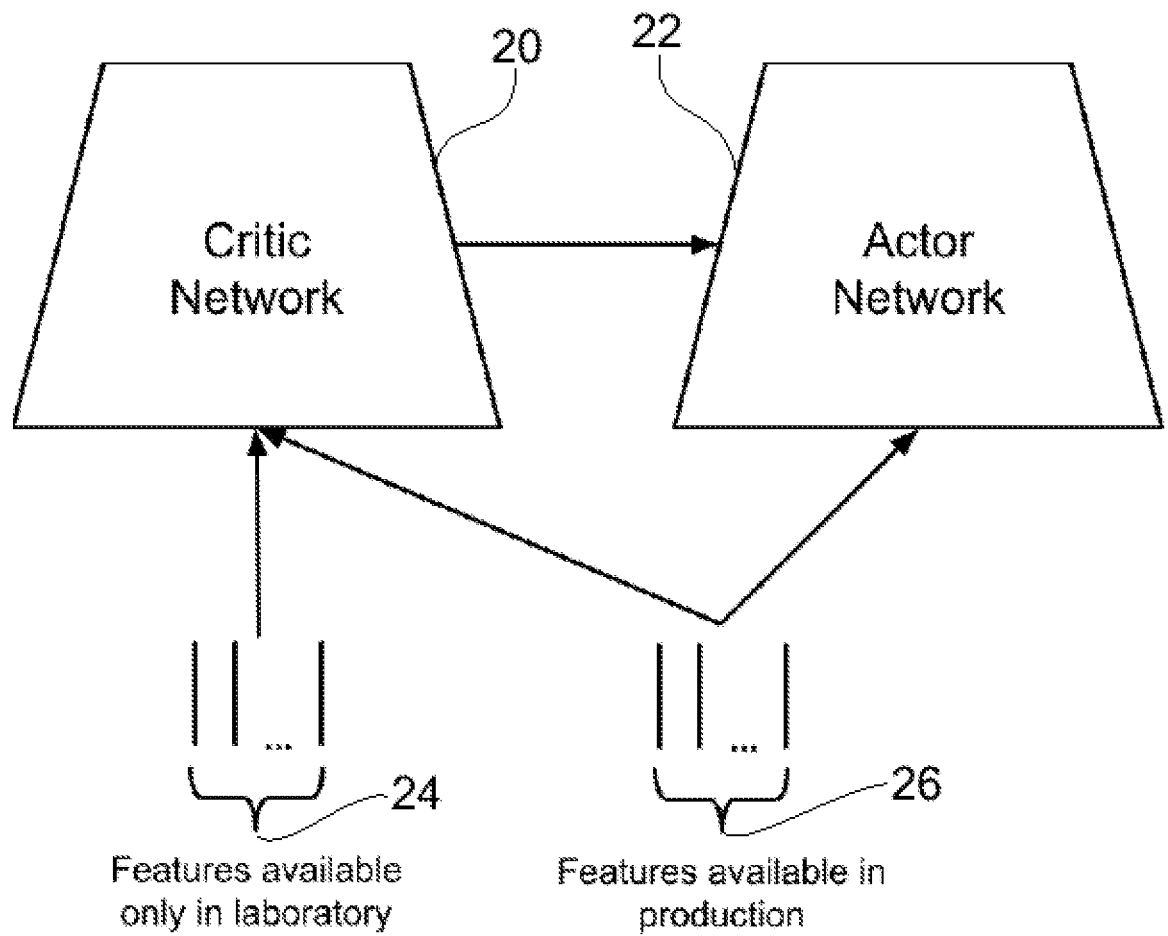
FIG. 2 illustrates a schematic representation of how a critic network is trained with state information available in both laboratory and production settings, while the actor network is trained with state information available in the production setting.

Referring to FIG. 2, because the critic 20, also referred to as the critic network 20, is not needed in production, embodiments of the present invention can train the critic 20 using all state information available in both the lab (lab state information 24) and production (production state information 26), while the actor 22 is trained using only the production state information 26 that provide observations available at production. This difference in information provided to each network ensures that the actor network 22 will behave as best it can with the information available during production, without limiting the optimization process.

Given computational and memory constraints in a production setting, it may only be possible to run an actor network of a certain size on the production device. Since the critic network is only required during training, the size of the critic network does not depend on production constraints. At the same time, optimization typically works better with larger actor networks than what is ultimately necessary to represent the final policy.

According to embodiments of the present invention, laboratory training of the agent can be performed with both a large critic network and a large actor network that allows for effective optimization. Then, a form of distillation can be used from a final, frozen critic network to create an actor network that can be run within the computational limits of production, as discussed below.

Figure 3:
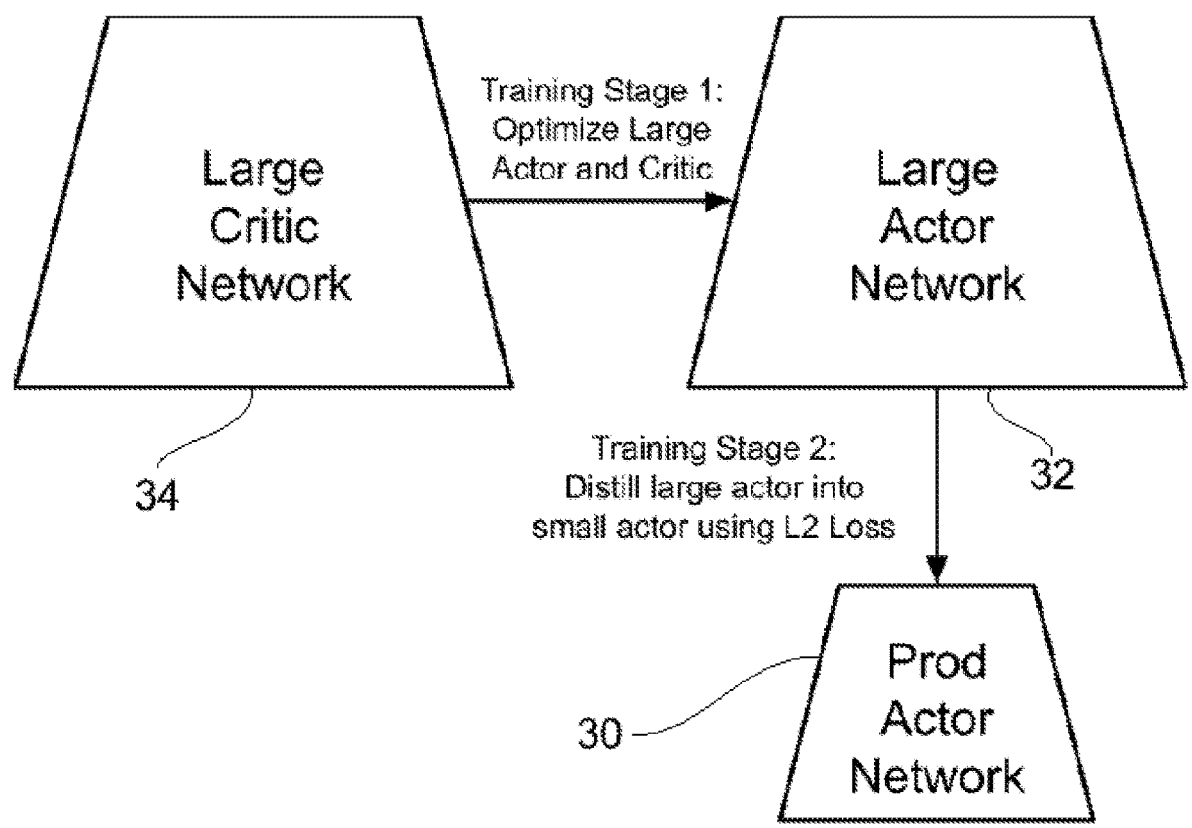
FIG. 3 illustrates a conventional process of optimizing a large actor network using an actor-critic approach and then distilling the production-ready actor directly from the large actor network.

Typical distillation methods, as shown in FIG. 3, aim to have the outputs of the small (production) actor network 30 be close to the outputs of the large actor network 32, which was initially trained using a large critic network 34, using an L2 loss norm or the like. However, with this conventional method, small errors in a policy output may result in large errors in cumulative future rewards.

Figure 4:
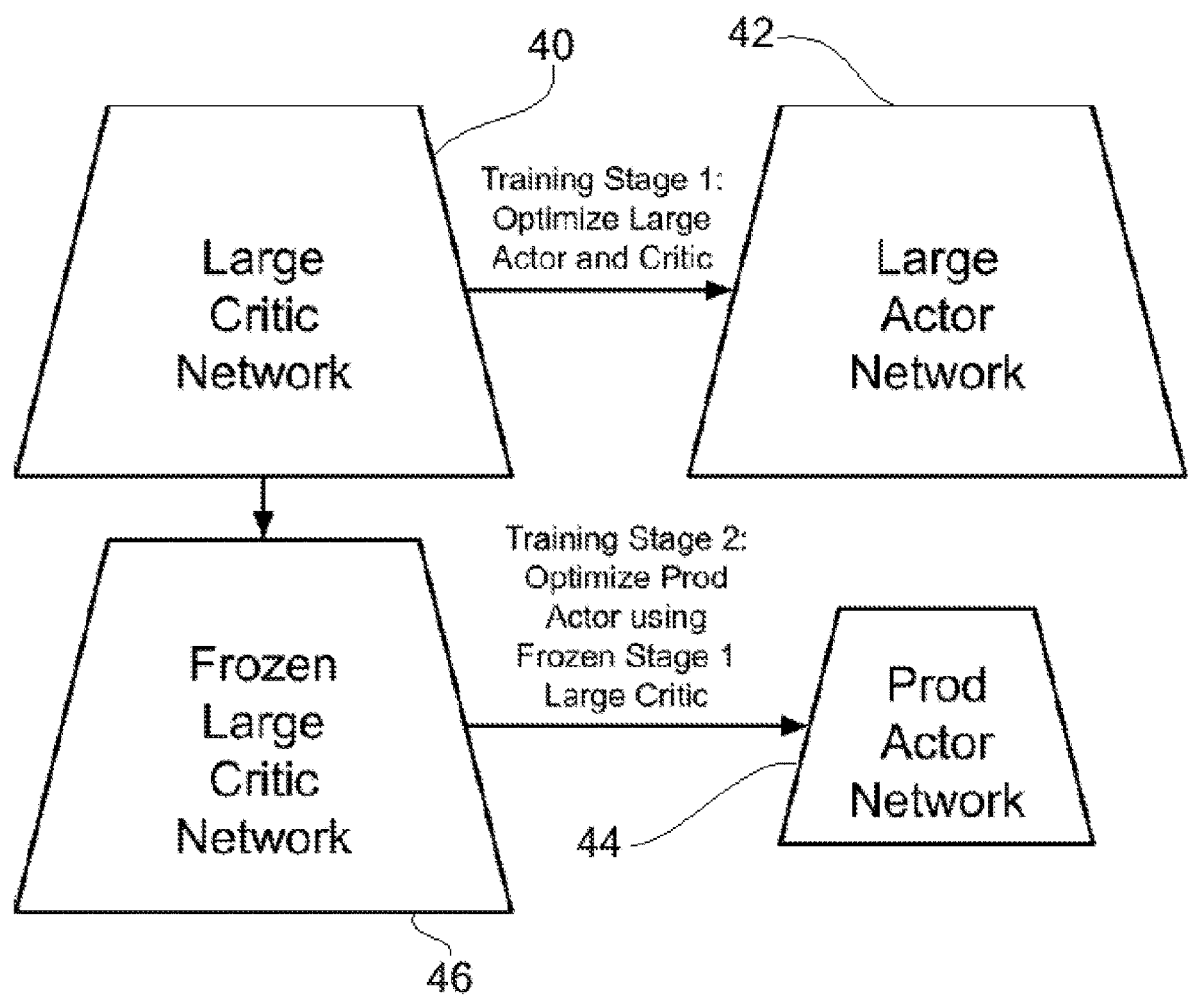
FIG. 4 illustrates a process according to an exemplary embodiment of the present invention where the actor-critic algorithm is run twice, first with a large actor network to aid in optimizing the critic network, and then, by re-using a frozen copy of the optimized critic network, to optimize the production ready actor network.

In aspects of the present invention, as shown in FIG. 4, in training stage one, a large critic network 40 and a large actor network 42 can be optimized through an actor-critic algorithm in training the agent. Then, the large actor network 42 can be distilled into a small actor network 44, suitable for use as the actor network in production, by having the small actor network 44 optimize a frozen version of the pre-trained critic network 46. This process can be performed quickly because it does not require any further interaction with the environment in the lab.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

The claims are thus to be understood to include what is specifically illustrated and described above, what is conceptually equivalent, what can be obviously substituted and also what incorporates the essential idea of the invention.

What is claimed is:

1. A method of training an agent, comprising:
   in a laboratory setting:
   training a policy using an actor-critic algorithm using an actor network and a critic network, the critic network using state information available in a both the laboratory setting and in a production setting and the actor network using state information available only in the production setting, wherein the state information used in the training of the policy in the laboratory setting includes information that is collected in the laboratory setting by at least one of (1) additional sensors of the agent available in the laboratory setting and not in the production setting and (2) greater compute resources available to the agent in the laboratory setting and not in the production setting, wherein the information is not collected in the production setting; and
   optimizing action choices of the actor network against the critic network;
   after training the policy in the laboratory setting, prior to deploying the policy to the production setting:
   duplicating the critic network into a frozen critic network;
   providing a production actor network through a distillation of the actor network and by optimizing the production actor network with the frozen critic network outside of the laboratory setting without requiring any further interaction with an environment of the laboratory setting;
   wherein the critic network is only required during training in the laboratory setting; and
   wherein the critic network is modeled based on an action value function as opposed to a state value function.

2. The method of claim 1, wherein the production actor network is the same as the actor network.

3. The method of claim 1, wherein the state information in the laboratory setting includes information from sensors unavailable in the production setting.

4. The method of claim 1, wherein the production actor network is smaller than the actor network.

5. The method of claim 1, wherein a first actor-critic algorithm runs during the training of the critic network and a second actor-critic algorithm runs during the step of optimizing the production actor network using the frozen critic network.

6. The method of claim 5, wherein the first actor-critic algorithm is the same as the second actor-critic algorithm.

7. A method of training an agent, comprising:
   in the laboratory setting:
   training a policy with an actor-critic algorithm using an actor network and a critic network the critic network using state information available in a both the laboratory setting and in a production setting and the actor network using state information available only in the production setting, wherein the state information is collected in the laboratory setting by at least one of (1) additional sensors of the agent available in the laboratory setting and not in the production setting and (2) greater compute resources available to the agent in the laboratory setting and not in the production setting, wherein the information; and
   optimizing action choices of the actor network against the critic network; and
   after training the policy in the laboratory setting, prior to deploying the policy to the production setting:
   providing a production actor network through a distillation of the actor network; and
   duplicating the critic network, when the training is complete, into a frozen critic network and optimizing the production actor network using the frozen critic network outside of the laboratory setting without requiring any further interaction with an environment of the laboratory setting, wherein
   wherein the critic network is only required during training in the laboratory setting;
   the production actor network is smaller than the actor network, and
   the critic network is modeled based on an action value function as opposed to a state value function.

8. The method of claim 7, wherein a first actor-critic algorithm runs during the training of the critic network and a second actor-critic algorithm runs during the step of optimizing the production actor network using the frozen critic network.

9. The method of claim 8, wherein the first actor-critic algorithm is the same as the second actor-critic algorithm.

10. The method of claim 7, wherein the state information used in the training of the policy in the laboratory setting includes information that is collected in the laboratory setting and is not collected in the production setting.

11. A non-transitory computer-readable storage medium with an executable program stored thereon, wherein the program instructs one or more processors to perform the following steps:
    in a laboratory setting:
    training a policy using an actor network and a critic network using an actor-critic algorithm, the critic network using state information available in a both the laboratory setting and in a production setting and the actor network using state information available only in the production setting, wherein the state information used in the training of the policy in the laboratory setting includes information that is collected in the laboratory setting by at least one of (1) additional sensors of the agent available in the laboratory setting and not in the production setting and (2) greater compute resources available to the agent in the laboratory setting and not in the production setting, wherein the information is not collected in the production setting; and
    optimizing action choices of the actor network against the critic network; and
    after training the policy in the laboratory setting, prior to deploying the policy to the production setting:
    duplicating the critic network into a frozen critic network;
    providing a production actor network through a distillation of the actor network and by optimizing the production actor network with the frozen critic network outside of the laboratory setting without requiring any further interaction with an environment of the laboratory setting;

wherein the critic network is only required during training in the laboratory setting; and wherein the critic network is modeled based on an action value function as opposed to a state value function.

12. The non-transitory computer-readable storage medium of claim 11, wherein the critic network is modeled based on an action value function.

13. The non-transitory computer-readable storage medium of claim 11, wherein the program instructs one or more processors to further perform:

when the training is complete, duplicating the critic network into a frozen critic network; and optimizing the production actor network using the frozen critic network.

14. The non-transitory computer-readable storage medium of claim 13, wherein the production actor network is smaller than the actor network.

15. The method of claim 1, wherein only the production actor network is run in the production setting.

16. The non-transitory computer-readable storage medium of claim 13, wherein only the production actor network is run in the production setting.

* * * * *